United States Patent
Hatanaka et al.

(10) Patent No.: US 7,502,050 B2
(45) Date of Patent: Mar. 10, 2009

(54) UNINTENTIONAL HAND MOVEMENT CANCELING DEVICE

(75) Inventors: Haruo Hatanaka, Kyoto (JP); Naoki Chiba, Higashi-Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 651 days.

(21) Appl. No.: 11/213,701

(22) Filed: Aug. 30, 2005

(65) Prior Publication Data

US 2006/0044403 A1 Mar. 2, 2006

(30) Foreign Application Priority Data

Aug. 31, 2004 (JP) ............................. 2004-253416

(51) Int. Cl.
*H04N 5/228* (2006.01)
(52) U.S. Cl. ............. 348/208.3; 348/208.4; 348/208.12
(58) Field of Classification Search ... 348/208.1–208.6, 348/208.12, 208.99, 211.9, 154, 155; 396/52, 396/54, 55
See application file for complete search history.

(56) References Cited

U.S. PATENT DOCUMENTS

| | | | | |
|---|---|---|---|---|
| 5,099,323 A | * | 3/1992 | Morimura et al. | 348/207.99 |
| 5,371,539 A | * | 12/1994 | Okino et al. | 348/208.6 |
| 5,502,484 A | | 3/1996 | Okada | |
| 5,563,652 A | * | 10/1996 | Toba et al. | 348/207.99 |
| 5,748,231 A | * | 5/1998 | Park et al. | 348/207.99 |
| 5,867,213 A | * | 2/1999 | Ouchi | 348/208.5 |
| 5,909,242 A | * | 6/1999 | Kobayashi et al. | 348/208.3 |
| 5,959,666 A | * | 9/1999 | Naganuma | 348/208.3 |
| 7,292,270 B2 | * | 11/2007 | Higurashi et al. | 348/208.3 |

| | | | |
|---|---|---|---|
| 2004/0085464 A1 | | 5/2004 | Higurashi et al. |

FOREIGN PATENT DOCUMENTS

| | | |
|---|---|---|
| CN | 1050953 C | 3/2000 |
| JP | 8-149360 A | 6/1996 |

(Continued)

OTHER PUBLICATIONS

Uomori, Kenya et al., "Automatic Image Stabilizing System by Full-Digital Signal Processing", IEEE Transactions on Consumer Electronics, vol. 36, No. 3, Aug. 1990, pp. 510-519.*

(Continued)

*Primary Examiner*—David L Ometz
*Assistant Examiner*—Gary C Vieaux
(74) *Attorney, Agent, or Firm*—Westerman, Hattori, Daniels & Adrian, LLP.

(57) ABSTRACT

Provided is an unintentional hand movement canceling device including: a zoom detection means detecting a value corresponding to a zoom magnification; a swing detection means detecting a swing of an image; and a correction quantity generating means generating a correction quantity to correct the swing of an image based on a swing quantity detected by the swing detection means and a value corresponding to a zoom magnification detected by the zoom detection means, the correction quantity having a variable characteristic of a non-corrected residue percent at a frequency of the swing, wherein the correction quantity generating means varies a characteristic of the non-corrected residue percent at the frequency of the swing depending on a value corresponding to a zoom magnification detected by the zoom detection means.

7 Claims, 13 Drawing Sheets

FOREIGN PATENT DOCUMENTS

JP    8-331430    12/1996

OTHER PUBLICATIONS

Uomori, Kenya et al., "Electronic Image Stabilization System for Video Cameras and VCRs", SMPTE Journal, Feb. 1992, pp. 66-75.*

Japanese Decision to Grant a patent mailed Aug. 14, 2008, issued in corresponding Japanese Application No. 2004-253416.

Chinese Office Action dated Feb. 15, 2008, issued in corresponding Chinese Patent Application No. 200510096650.1.

* cited by examiner

FIG. 9
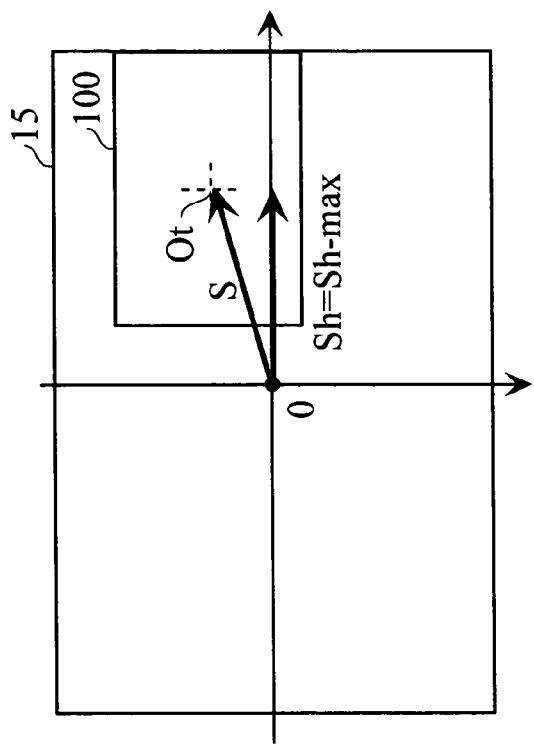
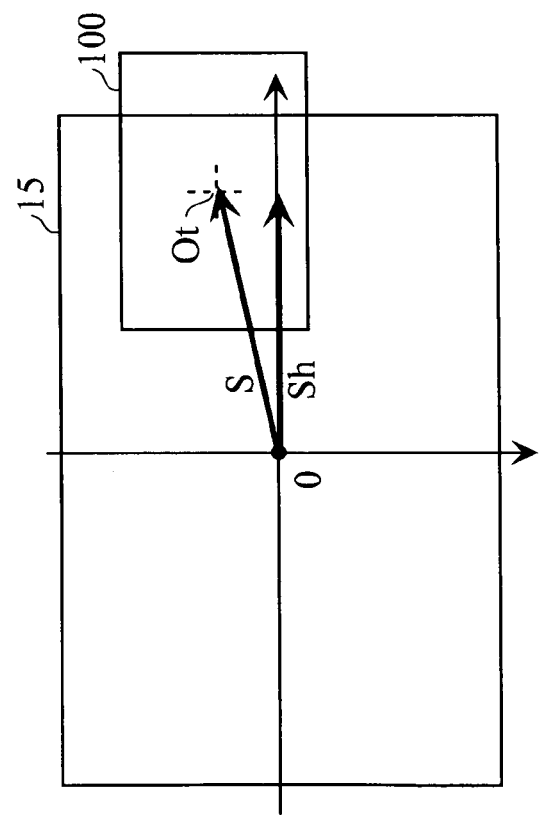

UNINTENTIONAL HAND MOVEMENT CANCELING DEVICE

BACKGROUND OF THE INVENTION

1. Field of the Invention

The invention relates to an unintentional hand movement canceling device installed in, for example a video camera and a digital camera.

2. Description of the Related Art

Since a video camera is in many cases used in hand-held shooting, an unintentional hand movement has been easy to occur in the shooting, therefore, generally, a video camera is equipped with an unintentional hand movement canceling device.

On the other hand, in the shooting, the video camera is, in many cases, subjected to a panning operation (a camera is moved in a direction, left or right) and a tilting operation (a camera is moved in a direction, upward or downward). If cancellation of unintentional hand movement is conducted by the unintentional hand movement canceling device during a panning operation or tilt operation, a phenomenon that a screen image does not move in an intentional direction occurs (hereinafter referred to as a sticking phenomenon).

Hence, in order to reduce a sticking phenomenon to occur during a panning operation or a tilting operation, a proposal has been offered on an unintentional hand movement canceling device performing a correcting control specially designed for the panning operation and tilting operation when the panning operation or tilting operation is detected.

For example, in Japanese Patent Application Laid-Open No. 8-331430, a construction is proposed in which a correction quantity is attenuated and a frequency characteristic of the correction quantity is varied according to a detection state of a panning operation or a tilting operation to thereby decrease the sticking phenomenon.

Since it is difficult to exactly discriminate a panning operation or a tilting operation from an unintentional hand movement, the sticking phenomenon occurs despite the measure to be taken. Especially, in an optical wide end with a low zoom magnification, a motion of screen image is comparatively small in both of the panning operation or tilt operation; therefore, a cancellation of unintentional hand movement is easily applied and a sticking phenomenon is conspicuously revealed. In addition, at an optical wide end, since a motion of a screen image is comparatively small even in a panning operation or a tilting operation, a change in a screen image becomes large when a state where an unintentional hand movement is canceled is transitioned to a state where an unintentional hand movement is not canceled if the unintentional hand movement is canceled at an initial stage of a panning operation or a tilting operation; therefore, there has occurred a problem that a strange feeling conspicuously appears at the optical wide end in a panning operation or a tilting operation.

SUMMARY OF THE INVENTION

It is an object of the invention to eliminate a conspicuously strange feeling in a panning operation and a tilting operation at the optical wide end even in a case where correct detection of a panning or tilting state is difficult.

A first unintentional hand movement canceling device according to the invention includes: a zoom detection means detecting a value corresponding to a zoom magnification; swing detection means detecting a swing of an image; and a correction quantity generating means generating a correction quantity to correct the swing of an image based on a swing quantity detected by the swing detection means and a value corresponding to a zoom magnification detected by the zoom detection means, the correction quantity having a variable characteristic of a non-corrected residue percent at a frequency of the swing, wherein the correction quantity generating means varies a characteristic of the non-corrected residue percent at the frequency of the swing depending on the value corresponding to a zoom magnification detected by the zoom detection means.

The correction quantity generating means is used, for example, that varies a characteristic of a non-corrected residue percent at a frequency of the swing so that, with a larger zoom magnification, a correction level gets stronger in a low frequency band of the swing.

A second unintentional hand movement canceling device according to the invention includes; zoom detection means detecting a value corresponding to a zoom magnification; swing detection means detecting a swing of an image; state discriminating means discriminating a swing state due to an intentional camera motion by a cameraman or a camerawoman from an unintentional hand movement state; a first correction quantity generating means generating a correction quantity to correct the swing of an image based on a swing quantity detected by the swing detection means and a value corresponding to a zoom magnification detected by the zoom detection means when it is determined by the state discriminating means that a current state is an unintentional hand movement, the correction quantity having a variable characteristic of a non-corrected residue percent at a frequency of the swing; and a second correction quantity generating means adopting a correction quantity of the immediately proceeding frame as a correction quantity for correcting the swing of the image when it is determined by the state discriminating means that a current state is a swing state due to an intentional camera motion by a cameraman or a camera woman, wherein the first correction quantity generating means varies a characteristic of the non-corrected residue percent at the frequency of the swing depending on a value corresponding to a zoom magnification detected by the zoom detection means.

The first correction quantity generating means, for example, varies a characteristic of non-corrected residue percent at the frequency of the swing so that with a larger zoom magnification, a correction level is stronger in a low frequency band of the swing.

The state discriminating means, for example, determines that a swing is in a swing state caused by an intentional camera movement of a cameraman or a camerawoman if one of the following conditions (a), (b) and (c) is satisfied:

(a) Frames having the same direction of the swing detected by the swing detecting means continuously occur and the number of the frames in continuation is a first threshold value or more;

(b) Frames having correction values of a upper limit value or more of a correction range generated by the first correction quantity generating means continuously occur and the number of the frames in continuation is a second threshold value or more; and (c) Frames having the same direction of the swing detected by the swing detecting means continuously occur and an integral value of the swing in the frames that continuously occur in the same direction is a third. threshold value or more of an image angle.

The state discriminating means includes, for example, a threshold value control means controlling the first threshold value, the second threshold value and the third threshold value so as to be adapted for a value corresponding to a zoom magnification detected by the zoom detection means.

The threshold value control means controls, for example, the first threshold value, the second threshold value and the third threshold value so that with a smaller zoom magnification, the first threshold value, the second threshold value and the third threshold value are decreased.

BRIEF DESCRIPTION OF THE DRAWINGS

FIG. 9 is model diagram for describing a processing in a case where a movement exceeds a correction range for an unintentional hand movement.

DESCRIPTION OF THE PREFERRED EMBODIMENTS

Description will be given of examples of the invention below with reference to the accompanying drawings.

Figure 1:
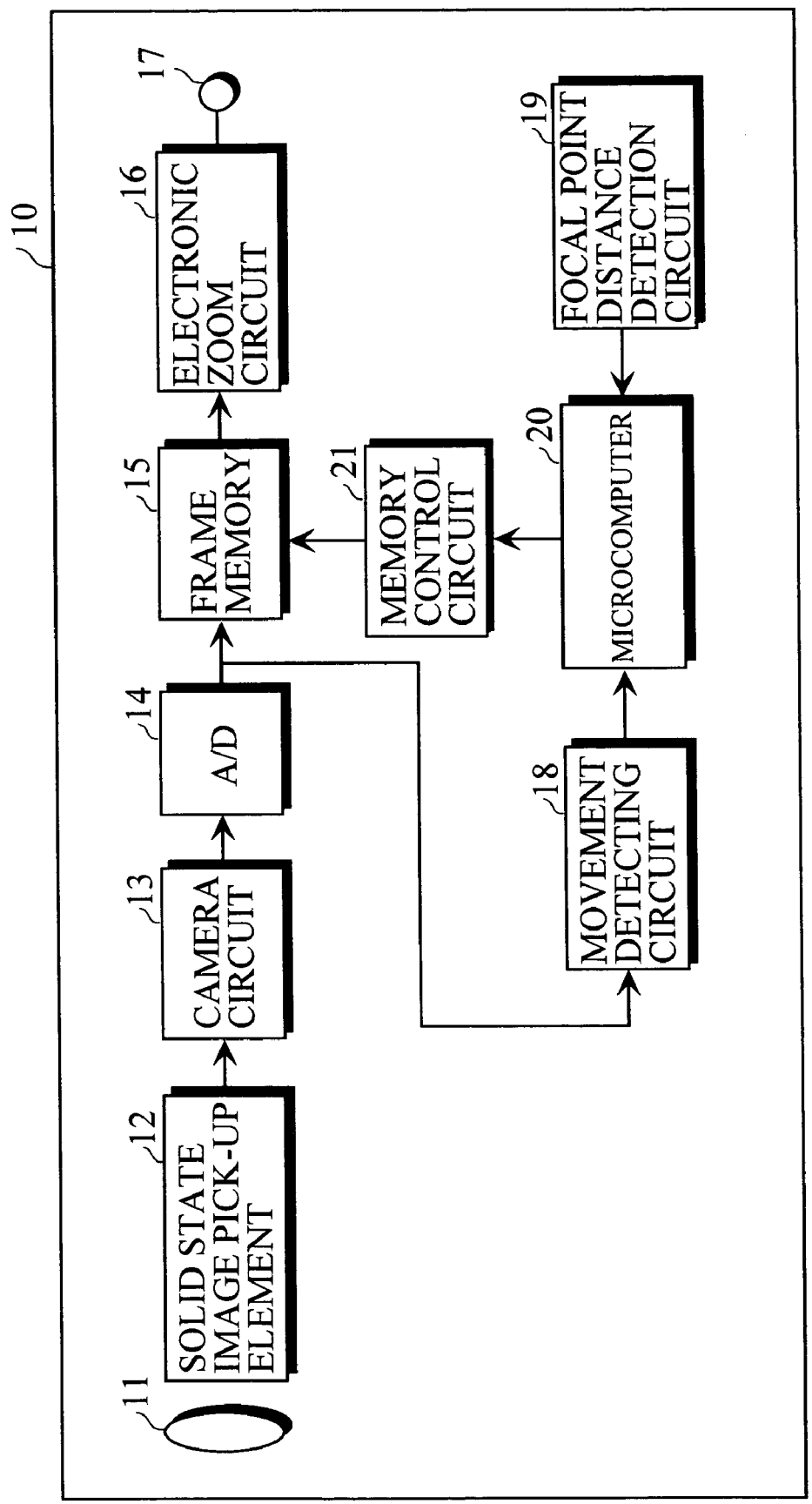
FIG. 1 is a block diagram showing an electric configuration of a video camera.

FIG. 1 shows a configuration of a video camera.

The video camera 10 includes: a solid state image pick-up element 12 such as CCD in which a light signal from an object (not shown) inputted from a lens 11 is converted to an electric signal. An electric signal from the solid state image pick-up element 12 is inputted to a camera circuit 13. The camera circuit 13, as well known, includes a sample holding circuit to sample-hold an electric signal from the solid state image pick-up element 12. Not only is a level of a sample-held electric signal adjusted by AGC, but a synchronizing signal is also attached thereto by a synchronizing signal attaching circuit. In such a way, the camera circuit 13 converts an image signal from the solid state image pick-up element 12 to an analog video signal.

The analog video signal outputted from the camera circuit 13 is further converted to a digital video signal by an A/D converter 14. A digital video signal outputted from the A/D converter 14 is given to a movement detecting circuit (swing detecting means) 18 and at the same time, written into a frame memory 15 by a memory control circuit 21.

Figure 2:
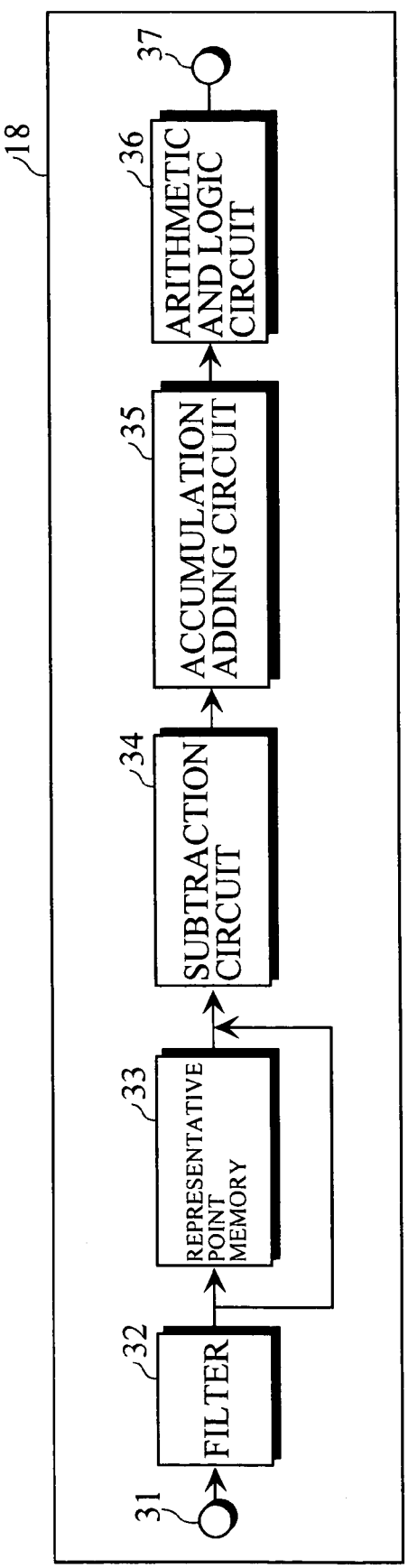
FIG. 2 is a block diagram showing an electric configuration of a movement detecting circuit.

FIG. 2 shows a configuration of a movement detecting circuit 18.

Figure 3:
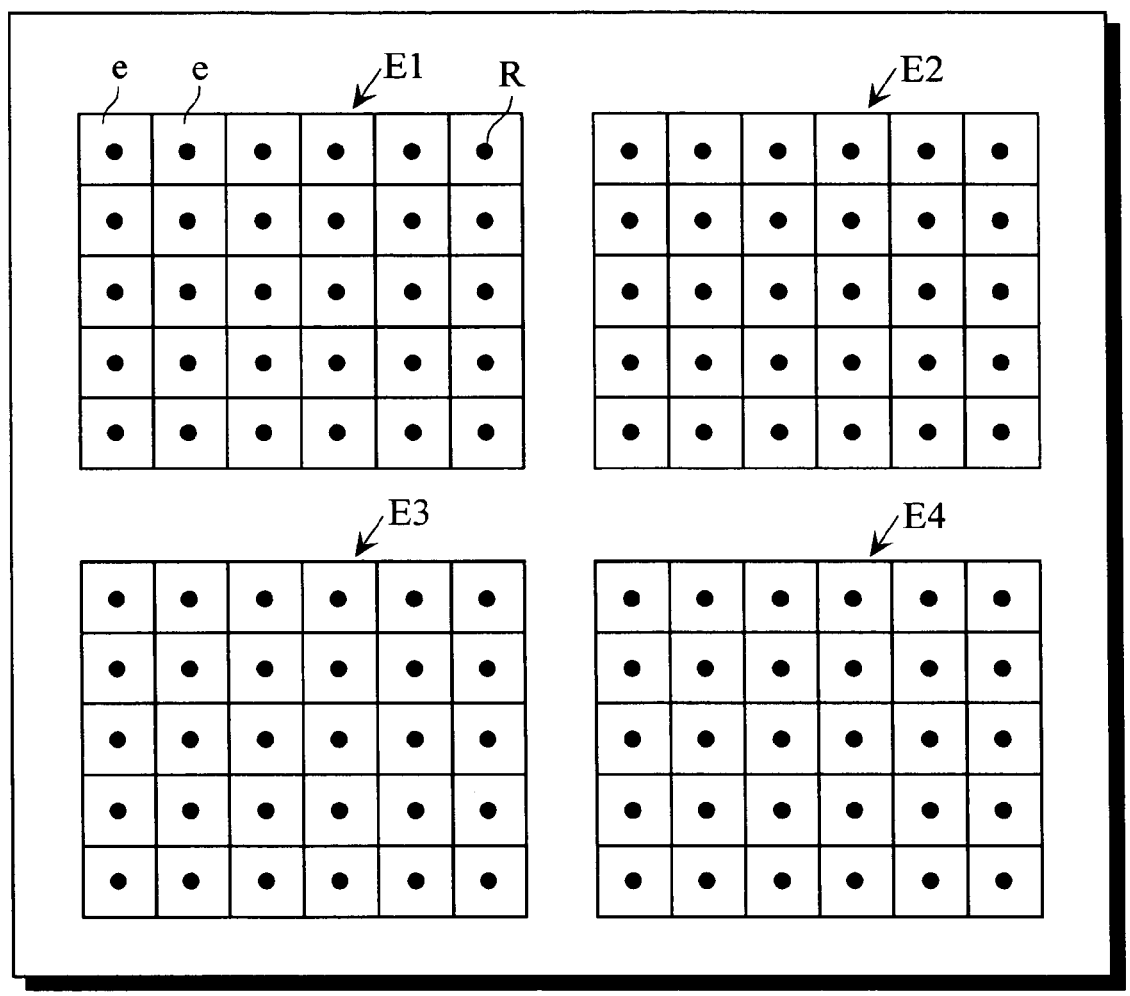
FIG. 3 is a model diagram showing plural motion vector detecting regions set in an image area.
Figure 4:
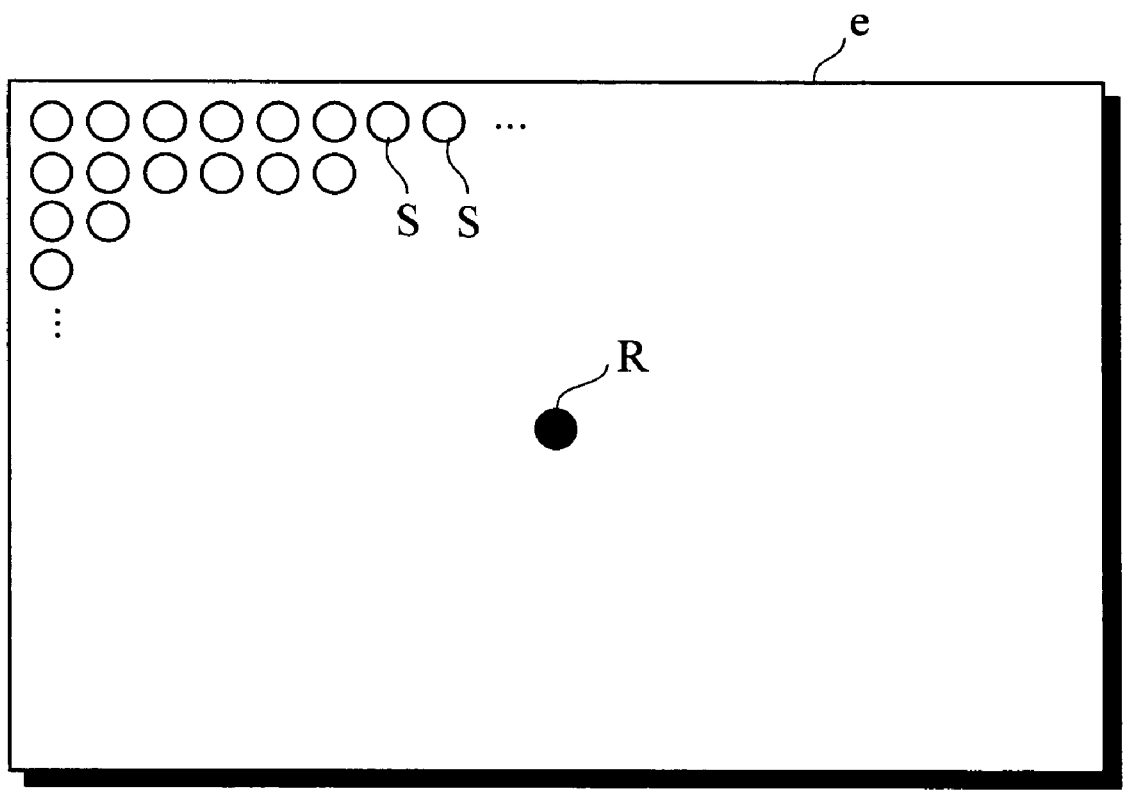
FIG. 4 is a model diagram showing plural sampling points set in small regions in each motion vector detecting region of FIG. 3 and one representative point.

The movement detecting circuit 18 detects a motion vector using, for example, a well known representative point matching method. Description will be given of an outline of the representative point matching method. Plural motion vector detection regions E1 to E4 are, as shown in FIG. 3, set in an image area of each frame. The motion vector detection regions E1 to E4 are the same as one another in size. Each of the motion vector detection regions E1 to E4 is divided into plural small regions e. In this example, each of the motion vector detection regions E1 to E4 is divided into 30 small regions e. Each of the small regions e is constituted of, for example, 32 pixels×16 rows. Plural sampling points S and one representative point R are, as shown in FIG. 4, set in each of the small regions e.

A difference between a pixel value (luminance value) at sampling points S in each of the small regions e in a current frame and a pixel value (luminance value) of the representative point R of the corresponding small regions e in the preceding frame (correlation values at the respective sampling point) are obtained in each of the motion vector detection regions E1 to E4. Then, correlation values are added and accumulated individually at the sampling points S with the respective same displacements from the representative point R of all the small regions e in each of the motion vector detection regions E1 to E4. Therefore, the correlation accumulated values in number corresponding to the number of the sampling points S in one small region e are obtained in each of the motion vector detection regions E1 to E4.

In each of the motion vector detection regions E1 to E4, a displacement from the representative point R having the minimum correlation accumulated value, that is, the displacement of a point with the highest correlation is extracted as a motion vector of the motion vector detection regions E1 to E4.

The movement detection circuit 18 includes an input end 31 at which a digital video signal from the A/D converter 14 is received and a digital video signal inputted from the input end 31 is given to a representative point memory 33 and a subtraction circuit 34 through a filter 32. The filter 32 is a kind of a digital low pass filter and used in order to improve an S/N ratio and secure sufficient detection precision with fewer representative points. The representative point memory 33 memorizes positional data and luminance data of the representative point R in each of the small regions e of each of the motion vector detection regions E1 to E4 shown in FIG. 3.

The subtraction circuit 34 performs subtraction between luminance data of the representative point of the preceding frame given from the representative point memory 33 and luminance data of the sampling points S of a current frame given from the input end 31 in each of the small regions e of each of the motion vector detection regions E1 to E4 to calculate a result in absolute value (a correlation value at each sampling point). Obtained correlation values at the sampling points are given to an accumulation adding circuit 35.

The accumulation adding circuit 35 adds and accumulates correlation values individually at the points having the same displacement from the representative point R in all the small regions e in each of the motion vector detection regions E1 to E4. The correlation accumulated values are given to an arithmetic and logic circuit 36.

The arithmetic and logic circuit 36 obtains not only the average value of correlation values in each of the motion vector detection regions E1 to E4, but also positional data of the pixel with the minimum correlation accumulated value. In such a way, the average values of correlation accumulated values, the minimum correlation accumulated values and positional data of the pixel with the minimum correlation value obtained in each of the respective motion vector detection regions E1 to E4 are given to a microcomputer 20 (see FIG. 1) from an output end 37.

The microcomputer 20 calculates a motion vector of the entire image (hereinafter referred to simply as overall motion vector) based on data given from the arithmetic and logic circuit 36. To begin with, a displacement from the representative point of a pixel with the minimum correlation accumulated value is obtained based on positional data of a pixel with the minimum correlation accumulated value in each of the motion vector detection regions E1 to E4 and the displacements are used as motion vectors (partial motion vectors) of the respective motion vector detection regions E1 to E4. Note that in order to better detection precision of partial motion vectors, correlation accumulated values of 4 pixels surrounding the pixel with the minimum correlation accumulated value may also be used and interpolated to calculate positional data of the pixel with the minimum correlation accumulated value.

The microcomputer 20 determines whether or not a value obtained by dividing the average value of the correlation accumulated values with the minimum correlation accumulated value is more than a given threshold value and further determines whether or not the average value of correlation accumulated values is a predetermined value or more in each of the motion vector detection regions E1 to E4; thereby determines whether or not partial motion vectors obtained in each of the motion vector detection regions E1 to E4 is reliable, that is, whether each of the motion vector detection regions E1 to E4 is valid or invalid. If, in a motion vector detection region, a value obtained by dividing the average value of the correlation accumulated values with the minimum correlation accumulated value is more than a given threshold value and the average value of the correlation accumulated values is more than a predetermined value, the motion vector detection region is regarded as a valid region.

To be concrete, whether or not a motion vector detection region is valid or invalid is determined in a way described below. First of all, if a contrast of a screen image is low, a luminance difference is low; therefore, the correlation accumulated value is decreased. For example, if the entire screen image is white, the correlation accumulated value is reduced. In such a case, a reliability is lost; therefore a motion vector detection region is regarded as valid when a relation that the average value of the correlation accumulated value≧a predetermined value. Note that the predetermined value is empirically determined.

In a case where a moving object exists in a motion vector detection region, a correlation accumulated value in a portion occupied by the moving object is different from a correlation accumulated value in a portion not occupied by the moving object and the portion occupied by the moving object takes various correlation accumulated values, which are generally larger (a correlation is low). Therefore, in a case where a moving object is in a motion vector detection region, a possibility is low that the minimum correlation accumulated value is high and there is a risk that a motion vector (partial motion vector) in a motion vector detection region is erroneously detected.

If a partial motion vector is erroneously detected, an overall motion vector is erroneously detected. If the average value of the correlation accumulated values is large, the detection can be reliable even if the minimum correlation accumulated value is large to some extent. On the other hand, if the average value of the correlation accumulated values is small, the detection cannot be relied on unless the minimum correlation accumulated value is smaller. Hence, to be concrete, a motion vector detection region satisfying a condition of (the average value of correlation accumulated values)/(the minimum correlation accumulated value)>5 is determined as a valid region and a partial motion vector of a motion vector detection region not satisfying the condition is not used to thereby prevent a harmful influence due to erroneous detection.

Whether or not each of the motion vector detection regions is valid is determined with the two conditions. Then, the average of partial motion vectors of motion vector detection regions each of which has been determined to be a valid region is obtained, the average is adopted as a movement quantity between frames, that is used as a movement quantity between frames, that is as the overall motion vector $V_n$. Overall motion vector $V_n$ expresses a movement quantity and a direction of the movement between the frames. The microcomputer 20 obtains an integral vector $S_n$ using the overall motion vector $V_n$. Description will be given later of a way to obtain the integral vector $S_n$. The integral vector $S_n$ expresses a distance from the center of a frame memory 15 to the center of a display region (a trimming frame).

Figure 5:
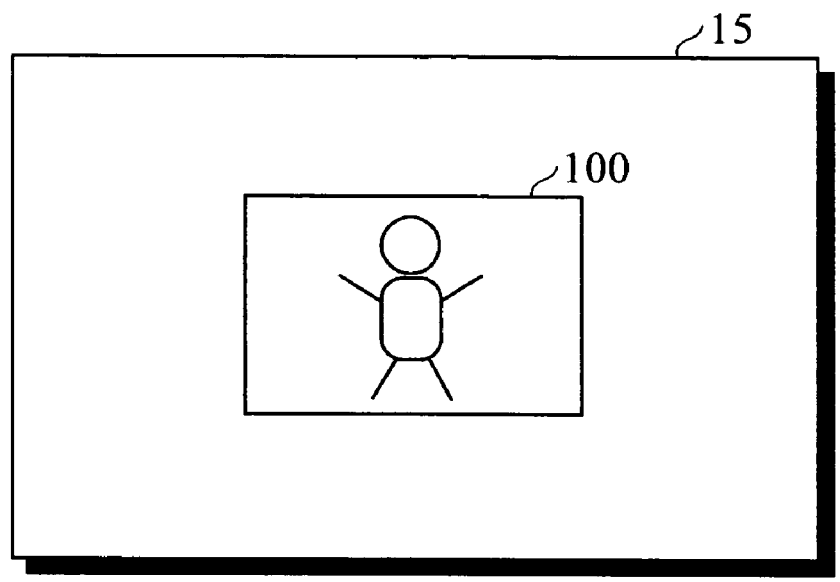
FIG. 5 is a model diagram showing a relationship between a frame memory and a trimming frame.
Figure 6:
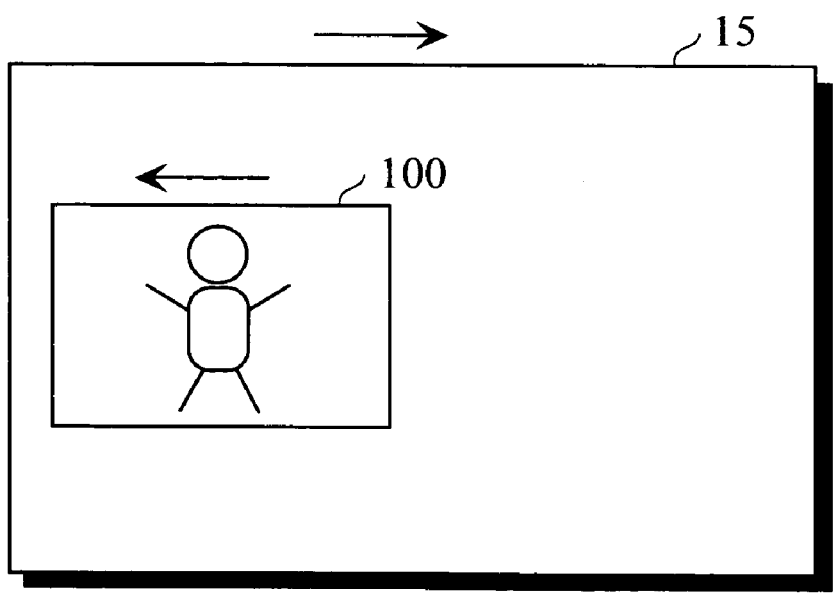
FIG. 6 is a model diagram showing a relationship between a frame memory and a trimming frame when a video camera moves in a right direction.

In correction for an unintentional hand movement, the correction is performed by changing a position of a display region in the frame memory 15 (image trimming position). In FIG. 5, there is shown a relationship between the frame memory 15 and the trimming frame 100. A region enclosed by the trimming frame 100 in the frame memory 15 is displayed as a picked-up image. An initial position of the trimming frame 100 is set at a position where the center of the trimming frame 100 coincides with the center of the frame memory 15. The initial position is moved so as to be adapted for a detected motion vector. For example, in FIG. 6, there is shown a relationship between the frame memory 15 and the trimming frame 100 when the video camera moves to the right. When the video camera is moved to the right, the object moves in the frame memory to the left. On this occasion, the trimming frame 100 is moved in a direction opposite the movement of the video camera by the movement quantity of the video camera, thereby no change occurs in the displayed screen image (figure) and the unintentional hand movement is cancelled.

Figure 7:
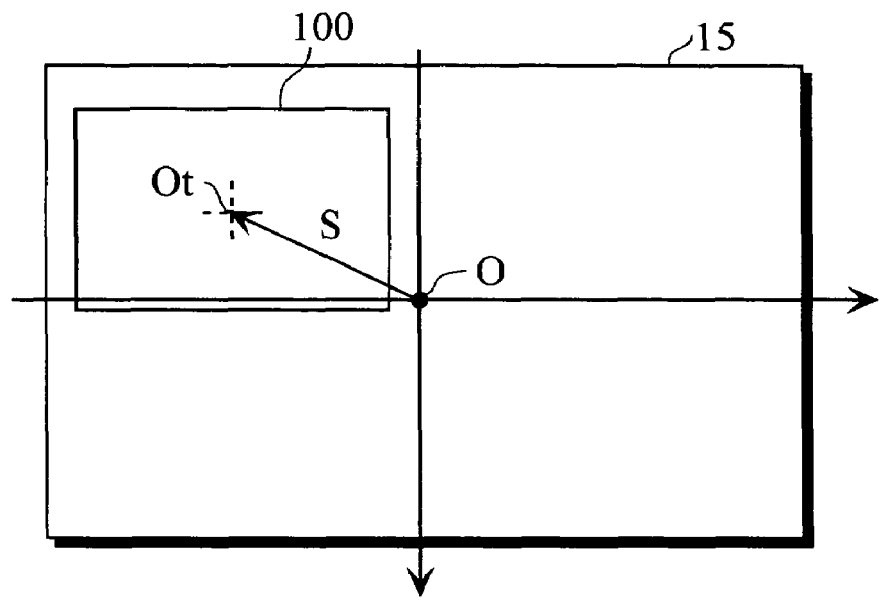
FIG. 7 is a model diagram showing a relationship between an integral vector and a trimming frame.

FIG. 7 shows a relationship between an integral vector $S_n$ and a trimming frame 100. A position of the trimming frame 100 is given with coordinates Ot of the center of the trimming frame 100 in an XY coordinate system with the center O of the frame memory 15 as the origin. If an integral vector of the current frame is indicated with S, a point in a distance indicated by the integral vector S in a direction shown by the integral vector S from the center O of the frame memory is the center Ot of the trimming frame 100.

Figure 8:
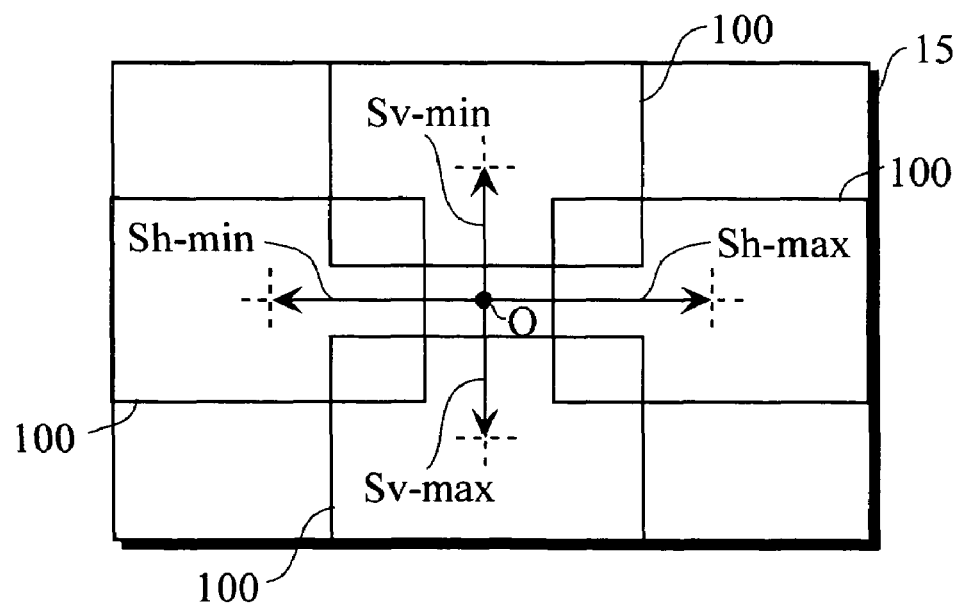
FIG. 8 is a model diagram for describing a correction range for an unintentional hand movement.

Here, as shown in FIG. 8, a correction range for an unintentional hand movement covers a range at which the trimming frame 100 reaches an end of the frame memory 15. That is, ranges of a horizontal component Sh and a vertical component Sv of the integral vector S are Sh-min to Sh-max; and Sv-min to Sv-max in FIG. 8, respectively.

In a case where the video camera, as shown in FIG. 9, moves by a great distance and the horizontal component Sh of the integral vector S exceeds a limit value of the correction range, the horizontal component Sh is set to Sh-min (the limit value) if the horizontal component is smaller than Sh-min, while the horizontal component Sh is set to Sh-max (the limit value) if the horizontal component is larger than Sh-max. In a case where the vertical component Sv exceeds a limit value of the correction range, similarly to the above, the vertical component Sv is set to Sv-min (the limit value) if the vertical component is smaller than Sv-min, while the vertical component Sv is set to Sv-max (the limit value) if the vertical component is larger than Sv-max.

A calculation method for an integral vector $S_n$ is different according to whether a current state is an unintentional hand movement state or a panning or tilting state. The states can be discriminated therebetween by the microcomputer 20. Data which indicates whether a current state is an unintentional hand movement state or a panning or tilting state is stored in a memory (not shown) of the microcomputer 20.

In the unintentional hand movement state, the microcomputer 20 obtains a damping coefficient K using a lens focal point distance F in terms of 35 mm film acquired from the focal point distance detecting circuit 19, the minimum focal point distance $F_{min}$ and the maximum focal point distance $F_{max}$, set in advance and the minimum damping coefficient value $K_{min}$ and the maximum damping coefficient value $K_{max}$, set in advance according to the following equation (1). In this example, a damping coefficient K is set in the range of from 0.9 to 0.95 for a focal point distance in the range of from 38 to 280 mm.

$$K = K_{min} + \frac{F - F_{min}}{F_{max} - F_{min}}(K_{max} - K_{min}) \quad (1)$$

An integral vector $S_n$ of a current frame is calculated using the obtained damping coefficient K and the overall motion vector $V_n$ and the integral vector $S_{n-1}$ of the preceding frame according to the following equation (2).

$$S_n = K \cdot S_{n-1} + V_n \quad (2)$$

Figure 10:
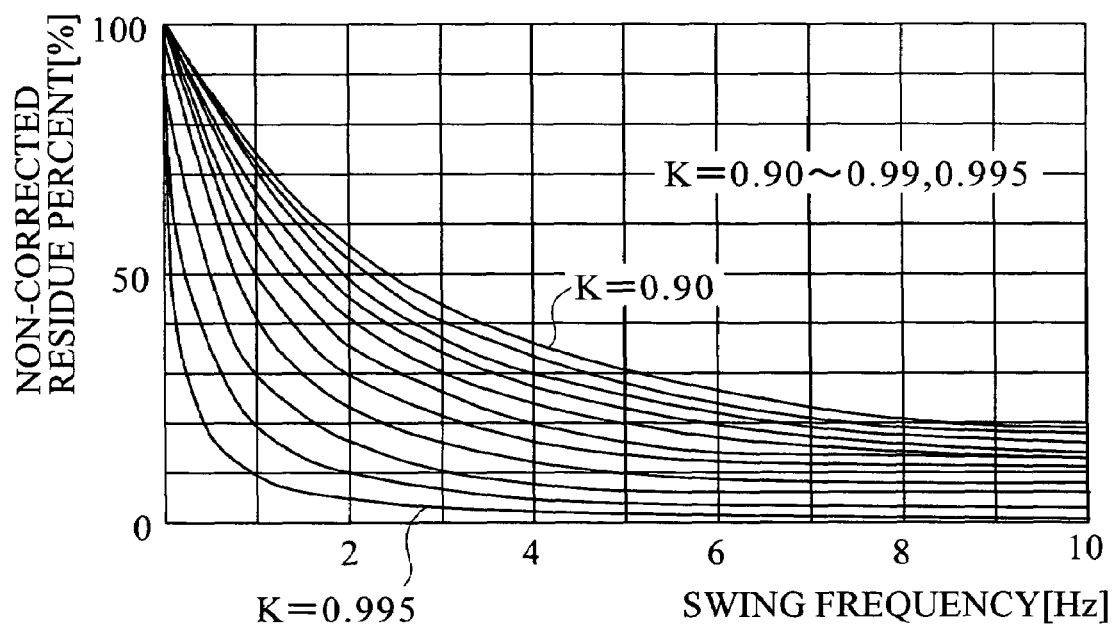
FIG. 10 is a graph showing a relationship between a swing frequency and a non-corrected residue percent with a damping coefficient as a parameter.

By controlling a damping coefficient K, a characteristic of a frequency of unintentional hand movement to be cancelled can be altered. FIG. 10 shows a relationship between a swing frequency [Hz] and a non-corrected residue percent with a damping coefficient K as a parameter. A non-corrected residue percent is defined as a proportion (%) of an amplitude in a swing after correction relative to an amplitude of a swing before the correction. For example, in a case where K=1.0, a detected movement can be perfectly corrected. In a case where K=0.90, a swing of 2 [Hz] is corrected by about 50% and a swing of 5 [Hz] is corrected by about 70%. That is, with a smaller damping coefficient K adopted, a correction level on a swing in a low frequency band is weakened.

By adopting the above calculation equation (1), in more of depth on the optical wide side with smaller zoom magnification (smaller focal point distance), a damping coefficient K is smaller. Therefore, since in more of depth on the optical wide side, a correction level for swing in the low frequency band is weakened, even in a case where detection in a panning or tilting state has failed, some of movement of a video camera when a panning or tilting state gets started remains not corrected to thereby alleviate a stick feeling. On the other hand, on the optical telephoto side with a larger zoom magnification (larger focal point distance), a damping K becomes larger and even a swing in a low frequency band is strongly corrected, while since a movement of an image when in panning and tilting is greatly larger than on the optical wide side and the correction range is exceeded in an instant, a stick feeling is naturally smaller. To the contrary, by strongly correcting a swing in the low frequency band as well, sufficient correction for unintentional hand movement can be effected.

In a panning or tilting state, the microcomputer 20, as shown in the following equation (3), regards the integral vector $S_{n-1}$ of the immediately preceding frame which is stored in the memory of the microcomputer 20 as the integral vector $S_n$ of the current frame. That is, it means that no correction is conducted for unintentional hand movement.

$$S_n = S_{n-1} \quad (3)$$

A transition from the unintentional hand movement to a panning or tilting state requires that one of the transition conditions (a), (b) and (c) is satisfied.

(a) A first condition for transition from an unintentional hand movement state to a panning or tilting state is that frames having overall motion vectors $V_n$ in the same direction continuously occur and the number of the frames in continuation is a threshold value TH1 or more.

To be concrete, frames having overall motion vectors $V_n$, directions (upward or downward) of vertical components of which are the same continuously occur, and the number of the frames in continuation is a threshold value TH1 or more or frames having overall motion vectors $V_n$ directions (left or right) of horizontal components of overall motion vectors $V_n$ of which are the same continuously occur and the number of the frames in continuation is a threshold value TH1 or more.

(b) A second condition for transition from an unintentional hand movement state to a panning or tilting state is that frames having integral vectors $S_n$ is a limit value or more of a correction range continuously occur and the number of the frames in continuation is a threshold value TH2 or more.

To be concrete, frames having integral vectors $S_n$, vertical components of which is a limit value or more of a correction range continuously occur and the number of the frames in continuation is a threshold value TH2 or more, or frames having integral vectors $S_n$, horizontal components of which is a limit value or more of a correction range continuously occur and the number of the frames in continuation is a threshold value TH2.

Note that in a case where a vertical component Sv of an integral vector $S_n$ falls outside a limit value of a correction range, a vertical component Sv is set to Sv-min (limit value) if being smaller than Sv-min, while a vertical component Sv is set to Sv-max (limit value) if being larger than Sv-max. In a case where a horizontal component Sh of an integral vector $S_n$ falls outside a limit value of a correction range, a horizontal component Sh is set to Sh-min (limit value) if being smaller than Sh-min, while a horizontal component Sh is set to Sh-max (limit value) if being larger than Sh-max.

(c) A third condition for transition from an unintentional hand movement state to a panning or tilting state is that frames having overall motion vectors $V_n$ in the same direction continuously occur and an integral value of the overall motion vectors $V_n$ in continuation in the same direction is a proportion of a threshold value TH3 or more of an image angle (an image size of a trimming frame).

To be concrete, frames having overall motion vectors $V_n$ directions of vertical components (upward or downward) of which are the same continuously occur and an integral value of the vertical components of the overall motion vectors $V_n$ is a proportion of a threshold value TH3 or more of a width in a direction, upward or downward, of a trimming frame; or frames having overall motion vectors $V_n$ directions (left or right) of horizontal components of which are the same continuously occur and an integral value of the horizontal components of the overall motion vectors $V_n$ which continuously occur in the same direction is a proportion of TH3 or more of a width in a direction, left or right, of a trimming frame.

The determination threshold values TH1, TH2 and TH3 of the (a), (b) and (c) are varied according to a focal point distance. To be concrete, a threshold value is calculated using the following equation (4):

$$TH = TH_{\min} + \frac{F - F_{\min}}{F_{\max} - F_{\min}}(TH_{\max} - TH_{\min}) \quad (4)$$

In the equation (4), F is a current focal point distance, $F_{min}$ and $F_{max}$ are the minimum focal point distance and the maximum focal point distance, which are determined in advance, $TH_{min}$ and $TH_{max}$ are the minimum threshold value and the maximum threshold value, which are set in advance. In this example, the following values are adopted as $F_{min}$ and $F_{max}$, and $TH_{min}$ and $TH_{max}$ for each of the determination conditions.

$F_{min}$=38 mm, $F_{max}$=280 mm (a) In calculation of TH1, $TH_{min}$=20 frames, $TH_{max}$=30 frames (b) In calculation of TH2, $TH_{min}$=5 frames, $TH_{max}$=10 frames (c) In calculation of TH3, $TH_{min}$=15%, $TH_{max}$=20%

For example, as to TH1, it is determined at an optical telephoto end that panning or tilting gets started if the number of frames in continuation is 30, while it is determined in an optical wide end that panning or tilting gets started, if the number of frames in continuation is 20. In such a way, since a determination threshold value is variable according to a focal point distance so that determination of panning or tilting on the wide side is loose, a detection sensitivity of panning or tilting on the wide side having a more conspicuous stick feeling is raised to thereby decrease the stick feeling.

A transition from a panning or tilting state to an unintentional hand movement state requires that one of the transition conditions (a), (b) and (c) is satisfied.

(a) A first transition condition from a panning or tilting state to an unintentional hand movement is that frames having overall motion vectors $V_n$ of 0.5 pixel or less continuously occur and the number of the frames in continuation is 10 or more.

To be concrete, frames having overall vectors $V_n$, vertical components of which is 0.5 pixel or less continuously occur and the number of the frames in continuation is 10 or more, or frames having overall vectors $V_n$ horizontal components of which is 0.5 pixel or less and the number of the frames in continuation is 10 or more.

(b) A second transition condition from a panning or tilting state to an unintentional hand movement is that frames having overall motion vectors $V_n$ in a direction opposite a direction of overall motion vectors $V_n$ when an unintentional hand movement state changes to a panning or tilting state continuously occur and the number of the frames is 10 or more.

To be more concrete, frames having overall motion vectors $V_n$ directions of vertical components of which are opposite directions of vertical components of overall motion vectors $V_n$ when an unintentional hand motion state changes to a panning or tilting state continuously occur and the number of the frames in continuation is 10 or more or frames having overall motion vectors $V_n$ directions of horizontal components of which are opposite directions of horizontal components of overall motion vectors $V_n$ when an unintentional hand motion state changes to a panning or tilting state continuously occur and the number of the frames in continuation is 10 or more.

An integral vector $S_n$ thus obtained is given to the memory control circuit 21. The memory control circuit 21 determines a start address for reading the frame memory 15 based on a given integral vector $S_n$ and reads a digital video signal stored in the frame memory 15 at the address. That is, the memory control circuit 21 moves a trimming frame 100 in the frame memory 15 based on the integral vector $S_n$ calculated by the microcomputer 20.

A digital video signal read from the frame memory 15 by the memory control circuit 21 is sent to the electronic zoom circuit 16. The electronic zoom circuit 16, in order to obtain a video signal corresponding to a size of the memory frame 15, enlarges an image using an interpolation method based on the digital video signal read from the frame memory 15. A digital video signal outputted from the electronic zoom circuit 16 is sent to the output terminal 17.

Figure 11:
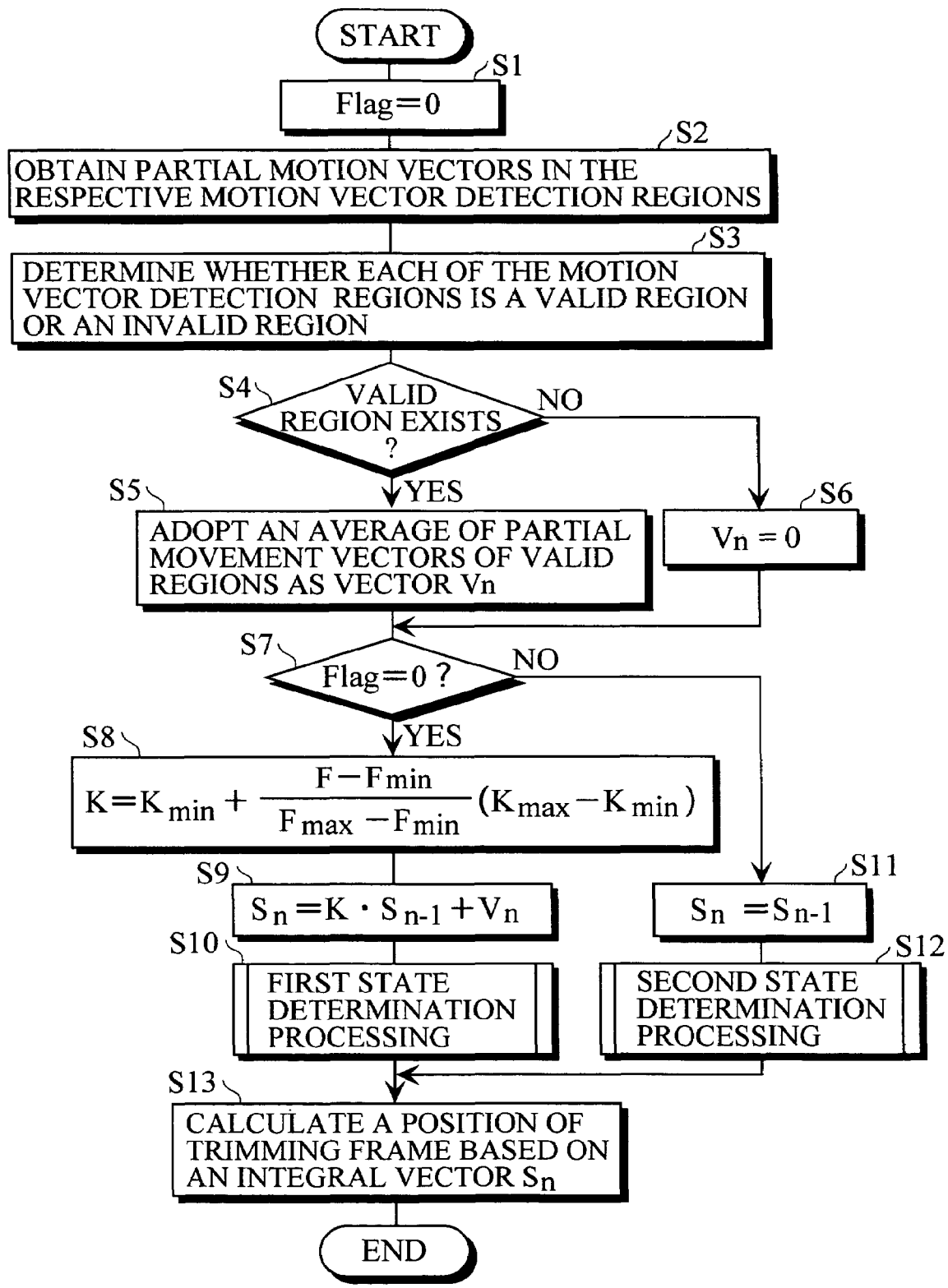
FIG. 11 is a flowchart showing operations in a video camera 10 performed for each frame.

FIG. 11 shows operations in the video camera 10 performed for each frame.

Flag used as a flag memorizing whether a current state is an unintentional hand movement state or a panning or tilting state. If Flag is reset (Flag=0), it shows that the current state is an unintentional hand movement state, while if Flag is set (Flag=1), it shows that the current state is a panning or tilting state.

To begin with, Flag is reset (Flag=0) (step S1). That is, an unintentional hand movement state is set as an initial state.

Partial motion vectors are obtained based on positional data of the pixel with the minimum correlation accumulated value in each of the motion vector detection regions E1 to E4 (step S2).

Then, it is determined whether each of the motion vector detection regions E1 to E4 is a valid region or an invalid region based on the average correlation accumulated value and the minimum correlation accumulated value in each of the motion vector detection regions E1 to E4 (step S3). Thereby, it is determined whether or not a valid region exists (step S4).

If a valid region exists, the average of partial motion vectors of the valid region is adopted as an overall motion vector $V_n$ (step S5). Then, the process advances to step S7. If no valid region exists, an overall motion vector $V_n$ is set to 0 (step S6). Then, the process advances to step S7. In step S7, it is determined whether or not Flag=0. That is, it is determined whether or not a current state is an unintentional hand movement or a panning or tilting state.

In a case where Flag=0, that is, if a current state is an unintentional hand movement, a focal point distance in terms of 35 mm film is acquired from the focal point distance detection circuit 19 and a damping coefficient K is calculated based on the equation (1) (step S8). An integral vector $S_n$ is calculated based on the equation (2) using the calculated K (step S9). Then, after the first state determination processing is conducted (step S10), the process advances to step S13. The first state determination processing will be described later.

In step S7, if Flag=1, that is, if a current state is a panning or tilting state, an integral vector $S_n$ is calculated based on the equation (3) (step S11). Then, after the second state determination processing is conducted (step S12), the process advances to step S13. The second state determination processing will be described later.

In step S13, a position of a trimming frame is calculated based on the integral vector $S_n$ calculated in step S9 or S11. Then, the current process is terminated.

Figure 12:
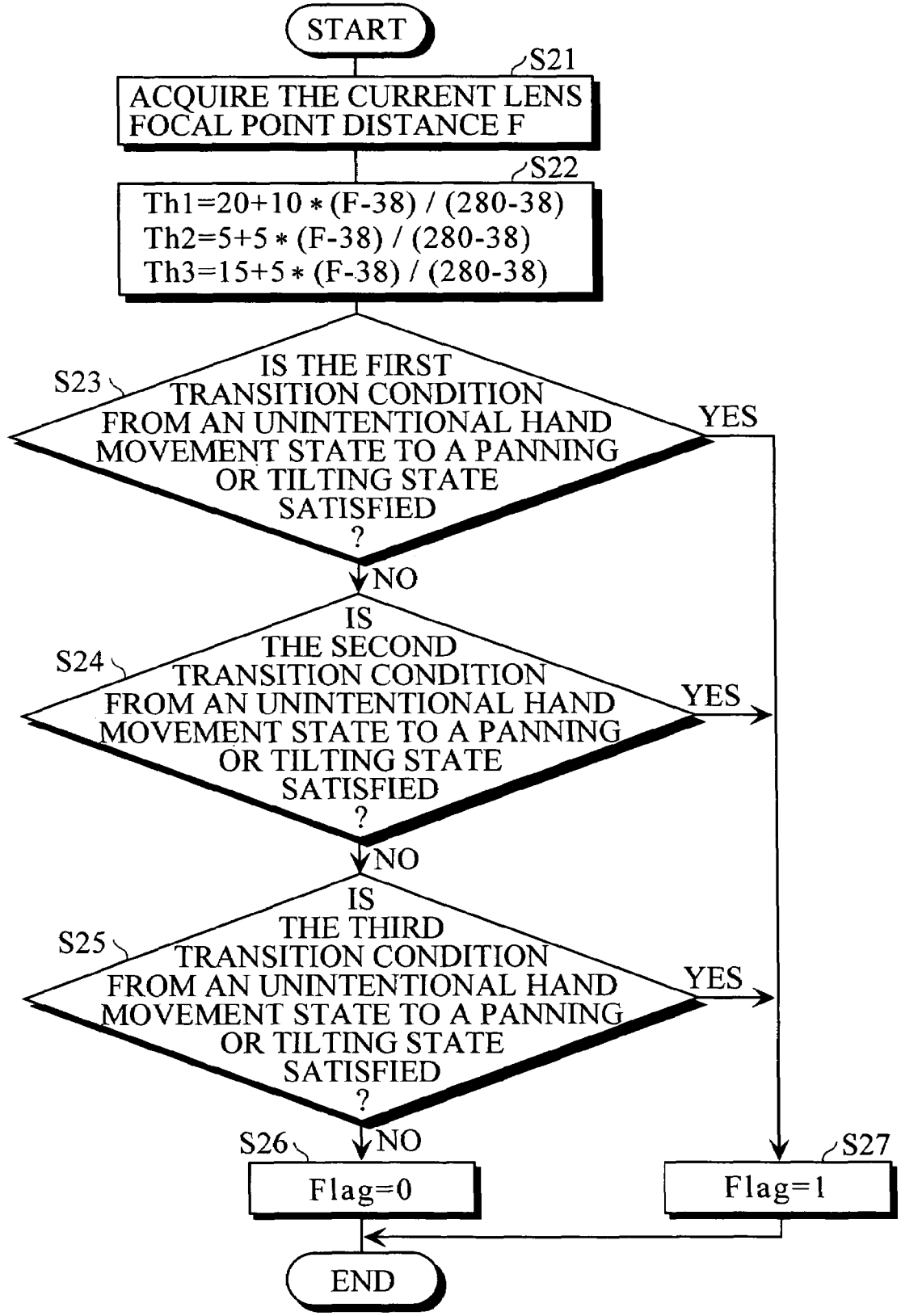
FIG. 12 is a flowchart showing a procedure for a first state determination processing in step S10 of FIG. 11.

FIG. 12 shows a procedure for the first state discrimination processing in step S10 of FIG. 11.

First of all, a current lens focal point distance F in terms of a 35 mm film is acquired (step S21). Threshold values for determination of a panning or tilting state Th1, Th2 and Th3 are calculated based on the equation (4) using the acquired focal point distance F (step 22).

In this example, Th1, Th2 and Th3 are calculated based on the following equations (5), (6) and (7).

$$Th1=20+10*(F-38)/(280-38) \quad (5)$$

$$Th2=5+5*(F-38)/(280-38) \quad (6)$$

$$Th3=15+5*(F-38)/(280-38) \quad (7)$$

Then, it is determined whether or not the first transition condition from an unintentional hand movement state to a panning or tilting state is satisfied (step S23). That is, it is determined whether or not a condition that frames having overall motion vectors $V_n$ in the same direction continuously occur and the number of the frames in continuation is the threshold value TH1 or more is satisfied. If the first transition condition is satisfied, it is determined that a current state is a panning or tilting state, that is, it is determined that an unintentional hand movement state has been transitioned to a panning or tilting state and Flag is set (Flag=1) (step S27). Then, the process moves to step S13 of FIG. 11.

If the first transition condition is not satisfied, it is determined whether or not the second transition condition from an unintentional hand movement state to a panning or tilting state is satisfied (step S24). That is, it is determined whether or not a condition that frames having integral vectors $S_n$ that are a limit value or more of a correction range continuously occur and the number of the frames in continuation is the threshold value TH2 or more is satisfied. If the second transition condition is satisfied, it is determined that a current state is a panning or tilting state, that is, it is determined that an unintentional hand movement state has been transitioned to a panning or tilting state and Flag is set (Flag=1)(step S27). Then, the process moves to step S13 of FIG. 11.

If the second transition condition is not satisfied, it is determined whether or not the third transition condition from an unintentional hand movement state to a panning or tilting state is satisfied (step S25). That is, it is determined whether or not a condition that frames having overall motion vectors $V_n$ in the same direction continuously occur and an integral value of the overall motion vectors $V_n$ continuously occur in the same direction is a predetermined portion TH3 (%) or more of an image angle (an image size of a trimming frames) is satisfied. If the third transition condition is satisfied, it is determined that a current state is a panning or tilting state, that is, it is determined that an unintentional hand movement state has been transitioned to a panning or tilting state, and Flag is set (Flag=1) (step S27). Then the process moves to step S13 of FIG. 11.

If the third transition condition is not satisfied, it is determined that a current state is an. unintentional hand movement state and Flag is reset (Flag=0) (step S26). Then, the process moves to step S13 of FIG. 11.

Figure 13:
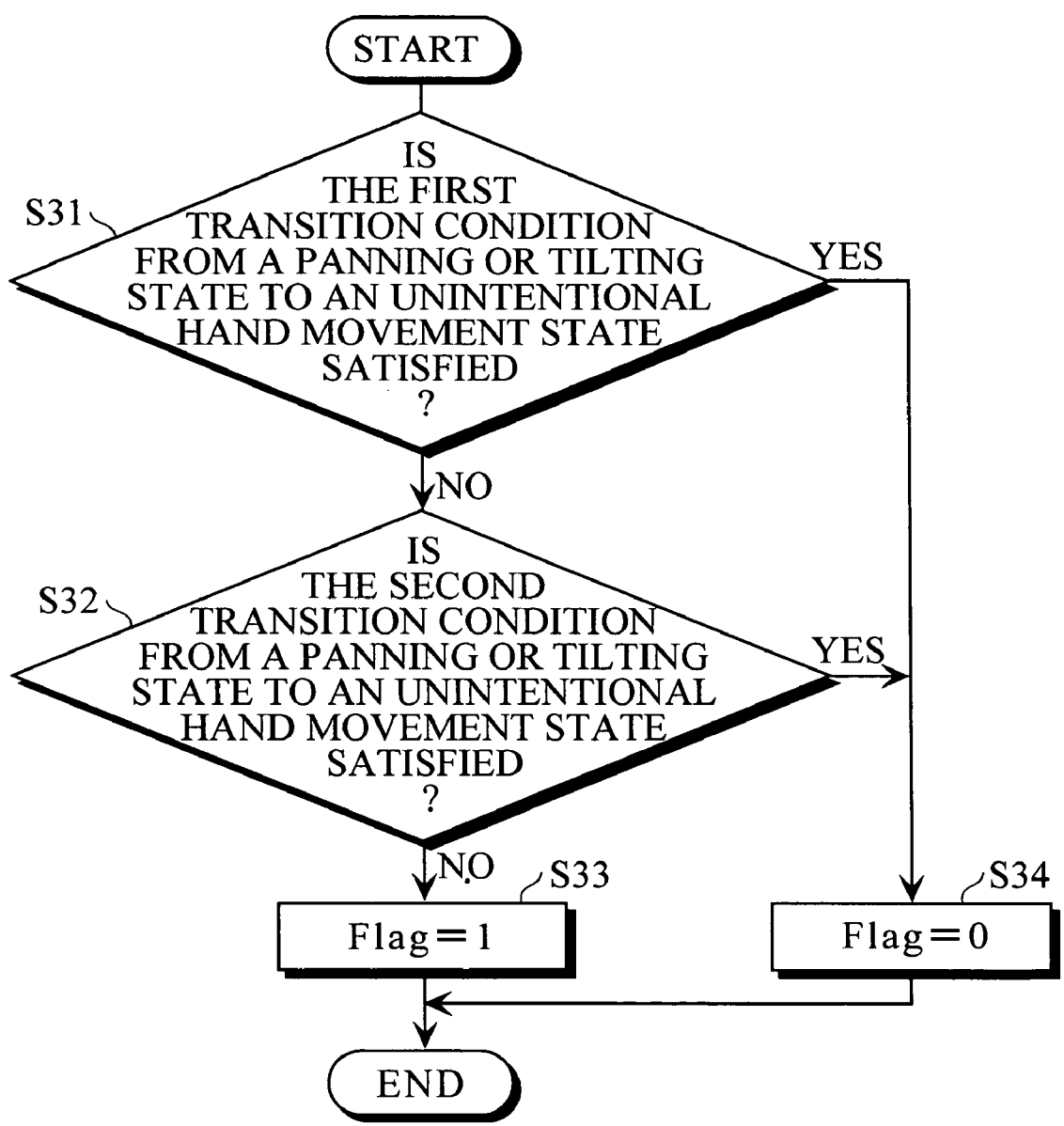
FIG. 13 is a flowchart showing a procedure for a second state determination processing in step S11 of FIG. 11.

FIG. 13 shows a procedure for the second state determination processing in step S11 of FIG. 11.

To begin with, it is determined whether or not the first transition condition from a panning or tilting state to an unintentional hand movement state is satisfied (step S31). That is, it is determined whether or not a condition that frames having overall motion vectors $V_n$ of 0.5 pixel or less continuously occur and the number of the frames in continuation is 10 or more is satisfied. If the first condition is satisfied, it is determined that a current state is an unintentional hand movement state, that is, it is determined that a panning or tilting state has been transitioned to an unintentional hand movement and Flag is reset (Flag=0) (step S34). Then, the process moves to step S13 of FIG. 11.

If the first transition condition is not satisfied, it is determined whether or not the second transition condition from a panning or tilting state to an unintentional hand movement state is satisfied (step S32). That is, it is determined that a condition that frames having overall motion vectors $V_n$ in directions opposite directions of overall motion vectors $V_n$ when an unintentional hand movement state is transitioned to a panning or tilting state continuously occur and the number of the frames in continuation is 10 or more is satisfied. If the second transition condition is satisfied, it is determined that a current state is an unintentional hand movement state, that is, it is determined that a panning or tilting state has been transitioned to an unintentional hand movement state and Flag is reset (Flag=0) (step S34). Then the process moves to step S13 of FIG. 11.

If the second transition condition is not satisfied, it is determined that a current state is a panning or tilting state and Flag is set (Flag=1) (step S33). Then the process moves to step S13 of FIG. 11.

In the video camera 10 operated in such a way, a damping coefficient K is decreased on an optical wide side where a stick feeling was conventionally conspicuous when a current state is a panning or tilting state. Hence, on the optical side, since a correction level for a swing in a low frequency band is weakened, some of movement of a video camera at an initial stage after the start of a panning or tilting operation remains non-corrected even in a case where detection of a panning or tilting state fails and a stick feeling is alleviated.

Since the determination threshold values TH1, TH2 and TH3 are altered so as to be adapted for a focal point distance F so that it is determined with ease that in more of depth on the optical wide side, a current state is a panning or tilting state, a detection sensitivity of a panning or tilting state in the optical wide side becomes higher and the sick feeling is alleviated on the optical wide side.

Therefore, as compared with a conventional case, operability on the optical wide side is improved (a clattering motion is reduced) and correction for an unintentional hand movement with a good operability can be realized over the all zoom regions.

Figure 14A:
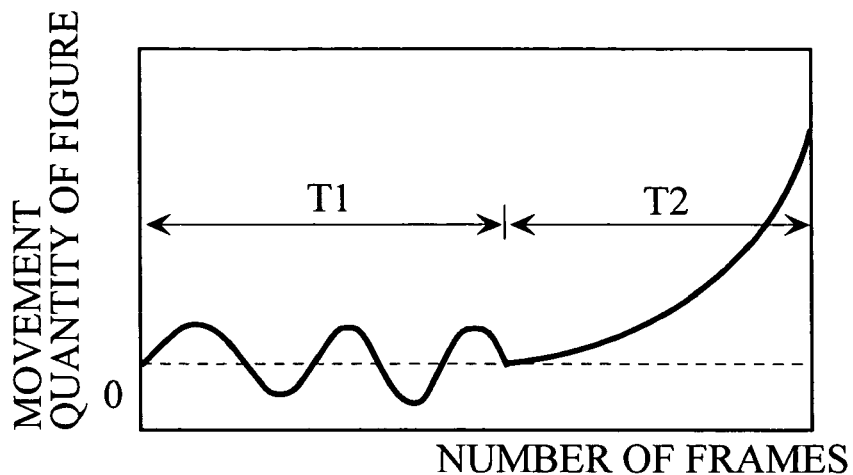
FIGS. 14A, 14B and 14C are graphs showing relationships between the number of frames and a movement quantity of a displayed image (figure) of a video camera 10 in a case where an unintentional hand movement state changes to a panning state as an actual state at an optical wide end.
Figure 14B:
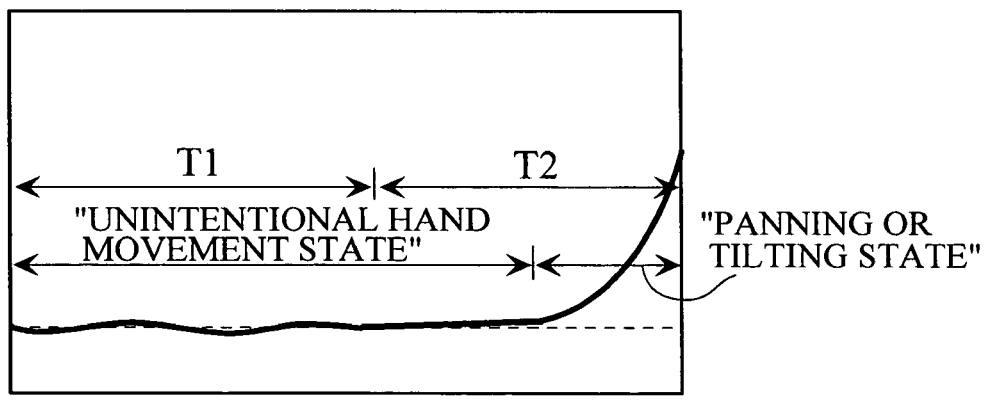
Figure 14C:
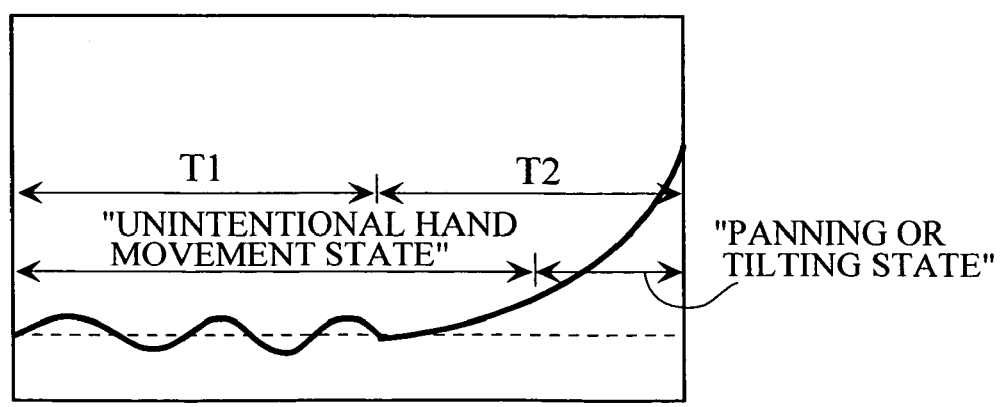

FIGS. 14A, 14B and 14C show relationships between the number of frames and a movement quantity of a displayed image (figure) of the video camera 10 in a case where an unintentional hand movement state changes to a panning state as an actual state at an optical wide end.

FIG. 14A shows a movement quantity of the figure in a case where no unintentional hand movement is cancelled, FIG. 14B shows a movement quantity of a figure in a case where correction for an unintentional hand movement is applied with a conventional technique (where a damping coefficient K is fixed to 0.95) and FIG. 14C shows a movement quantity of a figure in a case where correction for an unintentional hand movement correction is applied in the example (where a damping coefficient K is set to 0.9).

In a case where an actual state is an unintentional hand movement as shown in a period T1, it is determined in the video camera 10 as well that the actual state is an unintentional hand movement, and correction for the unintentional hand movement is applied with K=0.95 in a conventional technique (FIG. 14B) and with K=0.9 in the example (FIG. 14C). In the example (FIG. 14C), since a damping coefficient K is small, a non-corrected residue percent is comparatively high.

In a case where an unintentional hand movement state changes to a panning state as an actual state as shown in a period T2, it is determined even at an initial stage after the change that an actual state is an unintentional hand movement state; therefore, correction for an unintentional hand movement is applied, thereafter one of the first condition, the second condition and the third condition from an unintentional state to a panning or tilting state is satisfied and a result of determination by the video camera 10 is transitioned from an unintentional hand movement to panning or tilting state. As a result, no correction of an unintentional hand movement is applied and a movement of a figure after the correction becomes equal to a case where no correction for an unintentional hand movement is applied.

In a period till a result of determination of the video camera 10 is transitioned from an unintentional hand movement to a panning or tilting state after an unintentional state changes to a panning state as an actual state, a damping coefficient K is large in a conventional technique (FIG. 14B) and a swing of a low frequency component is strongly corrected; therefore, almost no gentle rise when a panning operation gets started is observed and not only does a stick phenomenon become conspicuous, but a phenomenon also becomes conspicuous that a screen image abruptly moves immediately after the transition to a panning or tilting state. On the other hand, in the example (FIG. 14C), since a damping coefficient K is small and a correction level for a swing of a low frequency component is weak, a gentle rise at the start of a panning operation remains more or less, thereby alleviating the stick phenomenon.

Figure 15A:
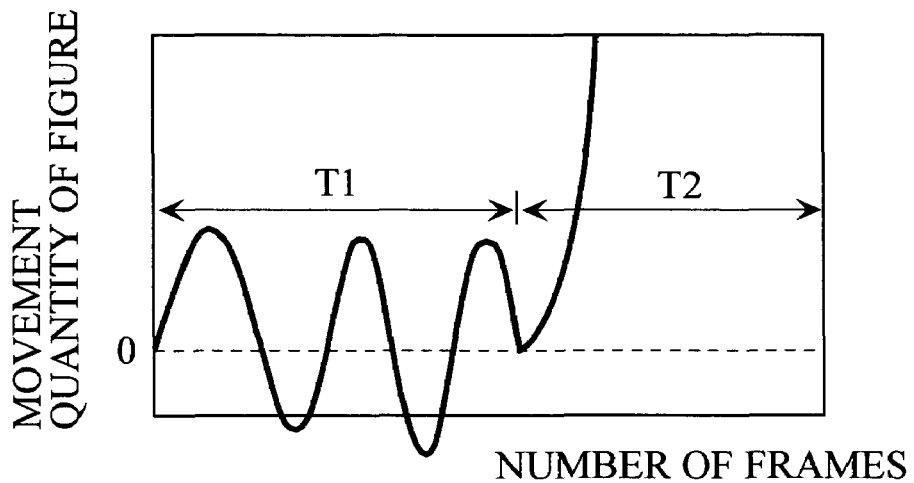
FIGS. 15A and 15B are graphs showing relationships between the number of frames and a movement quantity of a displayed image (figure) of a video camera 10 in a case where an unintentional hand movement state changes to a panning state as an actual state at an optical telephoto end.
Figure 15B:
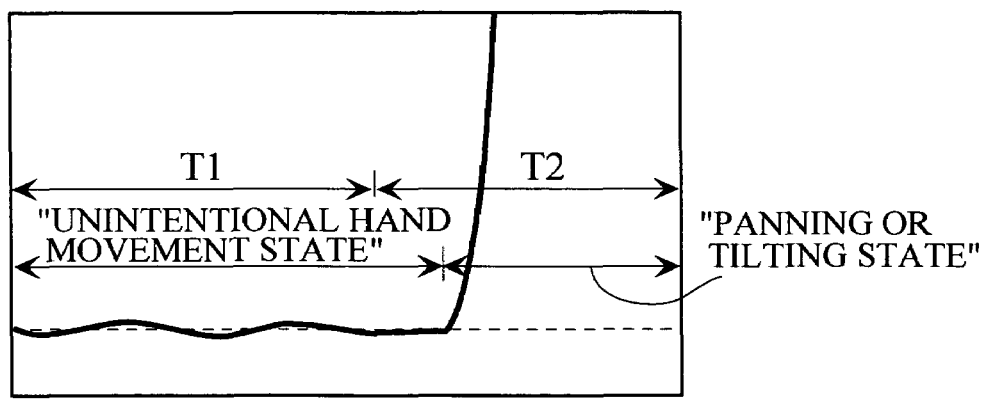

FIGS. 15A to 15B show relationships between the number of frames and a movement quantity of a displayed image (a figure) of the video camera 10 in a case where an unintentional hand movement state changes to a panning state as an actual state at an optical telephoto end.

FIG. 15A shows a movement quantity of a figure in a case where no correction for unintentional hand movement is applied and FIG. 15B shows a movement quantity of a figure in a case where correction for an unintentional hand movement was applied with a conventional technique and in the example (a damping coefficient K=0.95).

In a case where an actual state is, as shown in the period T1, an unintentional hand movement, it is determined in a conventional technique and the example that the actual state is an unintentional hand movement state and correction for an unintentional hand movement is applied with K=0.95. In a case where an unintentional hand movement, as shown in the period T2, changes to a panning state as an actual state, it is determined that a state even at an initial stage after the change is an unintentional hand movement state; therefore, correction for an unintentional hand movement is applied, and thereafter, one of the first transition condition, the second transition condition and the third transition condition from an unintentional hand movement to a panning or tilting state is satisfied, a result of the determination by the video camera 10 transitions from an unintentional hand movement state to a panning or tilting state. As a result, no correction for an unintentional hand movement is applied and a movement of a figure after the correction becomes equal to a case where no correction for an unintentional hand movement is applied.

Immediately after an unintentional hand movement state changes to a panning state as an actual state, it is determined that a current state is an unintentional hand movement state, while a movement in a display image is by far larger on the optical telephoto end than on the optical wide end and the movement falls outside a correction range in an instant, which renders an effect of an unintentional hand movement cancellation extinct; therefore, the stick feeling is naturally less at the optical telephoto end.

In the example, since the stick feeling is originally less on the optical telephoto side, even a swing with a low frequency can be sufficiently corrected with respect of an unintentional hand movement with a large damping coefficient in a similar way to a conventional technique, while on the optical wide side, a damping coefficient is reduced to retain a gentle rise as is at the start of an initial stage of a panning or tilting operation, thereby enabling the stick feeling to be reduced.

Note that a motion vector may be obtained, for example, using an angular velocity sensor, instead of a representative point matching method. Correction for an unintentional hand movement may also be applied, for example, by controlling a lens angle, a lens position or a light receiving element position instead of controlling a trimming position of an image memory.

What is claimed is:

1. An unintentional hand movement canceling device comprising:
    a zoom detection means detecting a value corresponding to a zoom magnification;
    a swing detection means detecting a swing of an image; and
    a correction quantity generating means generating a correction quantity to correct the swing of an image based on a swing quantity detected by the swing detection means and a value corresponding to a zoom magnification detected by the zoom detection means, the correction quantity having a variable characteristic of a non-corrected residue percent at a frequency of the swing,
    wherein the correction quantity generating means varies a characteristic of the non-corrected residue percent at the frequency of the swing depending on the value corresponding to a zoom magnification detected by the zoom detection means.

2. The unintentional hand movement canceling device according to claim 1, wherein the correction quantity generating means varies a characteristic of a non-corrected residue percent at a frequency of the swing so that, with a larger zoom magnification, a correction level gets stronger in a low frequency band of the swing.

3. An unintentional hand movement canceling device comprising:
    a zoom detection means detecting a value corresponding to a zoom magnification;
    a swing detection means detecting a swing of an image;
    a state discriminating means discriminating a swing state due to an intentional camera motion by a cameraman or a camerawoman from an unintentional hand movement state;
    a first correction quantity generating means generating a correction quantity to correct the swing of an image based on a swing quantity detected by the swing detection means and a value corresponding to a zoom magnification detected by the zoom detection means when it is determined by the state discriminating means that a current state is an unintentional hand movement, the correction quantity having a variable characteristic of a non-corrected residue percent at a frequency of the swing; and
    a second correction quantity generating means adopting a correction quantity of the immediately proceeding frame as a correction quantity for correcting the swing of the image when it is determined by the state discriminating means that a current state is a swing state due to an intentional camera motion by a cameraman or a camerawoman, wherein the first correction quantity generating means varies a characteristic of the non-corrected residue percent at the frequency of the swing depending on a value corresponding to a zoom magnification detected by the zoom detection means.

4. The unintentional hand movement canceling device according to claim 3, wherein the first correction quantity generating means varies a characteristic of non-corrected residue percent at the frequency of the swing so that with a larger zoom magnification, a correction level is stronger in a low frequency band of the swing.

5. The unintentional hand movement canceling device according to claim 3, wherein the state discriminating means determines that a swing is in a swing state caused by an intentional camera movement of a cameraman or a camerawoman if one of the following conditions (a), (b) and (c) is satisfied:

(a) Frames having the same direction of the swing detected by the swing detecting means continuously occur and the number of the frames in continuation is a first threshold value or more;

(b) Frames having correction quantity of a upper limit value or more of a correction range generated by the first correction quantity generating means continuously occur and the number of the frames in continuation is a second threshold value or more; and (c) Frames having the same direction of the swing detected by the swing detecting means continuously occur and an integral value of the swing in the frames that continuously occur in the same direction is a third threshold value or more of an image angle.

6. The unintentional hand movement canceling device according to claim 5, wherein the state discriminating means includes threshold value control means controlling the first threshold value, the second threshold value and the third threshold value so as to be adapted for a value corresponding to a zoom magnification detected by the zoom detection means.

7. The unintentional hand movement canceling device according to claim 6, wherein the threshold value control means controls the first threshold value, the second threshold value and the third threshold value so that with a smaller zoom magnification, the first threshold value, the second threshold value and the third threshold value are decreased.

* * * * *